United States Patent
Ikeda et al.

(10) Patent No.: US 7,632,580 B2
(45) Date of Patent: Dec. 15, 2009

(54) PERPENDICULAR MAGNETIC RECORDING MEDIUM HAVING AN INTERLAYER OF A NON-MAGNETIC NICKEL ALLOY

(75) Inventors: Yoshihiro Ikeda, San Jose, CA (US);
Mary F. Minardi, Santa Cruz, CA (US);
Kentaro Takano, San Jose, CA (US);
Qi-Fan Xiao, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 650 days.

(21) Appl. No.: 11/146,348

(22) Filed: Jun. 6, 2005

(65) Prior Publication Data
US 2006/0275629 A1   Dec. 7, 2006

(51) Int. Cl.
G11B 5/66 (2006.01)
(52) U.S. Cl. ........... 428/832.3; 360/131; 427/131
(58) Field of Classification Search ........... 428/832.3
See application file for complete search history.

(56) References Cited

U.S. PATENT DOCUMENTS

| | | | |
|---|---|---|---|
| 6,682,826 B2 * | 1/2004 | Shimizu et al. | 428/828 |
| 6,759,148 B2 | 7/2004 | Tanahashi et al. | |
| 6,858,320 B2 * | 2/2005 | Takenoiri et al. | 428/611 |
| 2003/0017370 A1 | 1/2003 | Shimizu et al. | |
| 2003/0059651 A1 | 3/2003 | Shimizu et al. | |
| 2003/0118867 A1 | 6/2003 | Koda et al. | |
| 2004/0001975 A1 | 1/2004 | Hikosaka et al. | |
| 2004/0013909 A1 | 1/2004 | Shimizu et al. | |
| 2004/0033390 A1 | 2/2004 | Oikawa et al. | |
| 2004/0057157 A1 | 3/2004 | Shimizu et al. | |
| 2004/0106010 A1 | 6/2004 | Iwasaki et al. | |
| 2004/0224185 A1 | 11/2004 | Nakamura et al. | |
| 2004/0229083 A1 | 11/2004 | Maeda et al. | |
| 2005/0019608 A1 * | 1/2005 | Kim et al. | 428/694 BS |
| 2008/0024918 A1 * | 1/2008 | Gouke | 360/135 |

FOREIGN PATENT DOCUMENTS

| | | |
|---|---|---|
| JP | 2003123239 | 4/2003 |
| JP | 2003242622 | 8/2003 |

OTHER PUBLICATIONS

Osaka et al., "The effects of an underlayer recording characteristics of electroless plated perpendicular recording flexible media", IEEE TRan Magn, vol. MAG-23, No. 5, Sep. 1987, pp. 2356-2358.*

* cited by examiner

*Primary Examiner*—Holly Rickman
(74) *Attorney, Agent, or Firm*—Duft Bornsen & Fishman, LLP

(57) ABSTRACT

Perpendicular magnetic recording media and methods of fabricating perpendicular magnetic recording media are described. The perpendicular magnetic recording medium of one embodiment includes an interlayer, an underlayer, and a perpendicular magnetic recording layer. The interlayer is comprised of a Ni-alloy having the characteristics of being nonmagnetic and having an FCC structure. The alloying element for the Ni-alloy may comprise one of V or Cr, or may comprise one of V, Cr, or W. The concentration of the alloying element is set such that the concentration of the alloying element is high enough to make the Ni-alloy non-magnetic, while low enough to maintain an FCC structure for the Ni-alloy.

19 Claims, 5 Drawing Sheets

TABLE 900

| ORIENTATION LAYER MATERIAL AND THICKNESS | SNR AT 440 kfci RELATIVE TO SAME STRUCTURE WITH 2 nm Ni-19 ATOMIC % Fe | COERCIVITY (Oe) |
|---|---|---|
| 1.5 nm Cu-3 AT.% Nb | 0.5 | 6110 |
| 4 nm Ni-10 AT.% V | 0.7 | 6320 |
| 4 nm Ni-20 AT.% Cr | 0.9 | 6740 |
| 4 nm Ni-8 AT.% W | 1.0 | 7260 |

PERPENDICULAR MAGNETIC RECORDING MEDIUM HAVING AN INTERLAYER OF A NON-MAGNETIC NICKEL ALLOY

BACKGROUND OF THE INVENTION

1. Field of the Invention

The invention is related to the field of magnetic disk drive systems and, in particular, to a perpendicular magnetic recording medium having an interlayer of a non-magnetic Nickel (Ni) alloy.

2. Statement of the Problem

One type of recording medium currently used in magnetic recording/reproducing apparatuses is a longitudinal magnetic recording medium. A longitudinal magnetic recording medium includes a magnetic recording layer having an easy axis of magnetization parallel to the substrate. The easy axis of magnetization is the crystal axis that is aligned along the lowest energy direction for the magnetic moment. Another type of recording medium is a perpendicular magnetic recording medium. A perpendicular magnetic recording medium includes a magnetic recording layer having an easy axis of magnetization oriented substantially perpendicular to the substrate. Hexagonal Close Packed (HCP) Co-alloys are typically used as the magnetic recording layer for both longitudinal and perpendicular recording. The easy axis of magnetization for these materials lies along the c-axis or <0001> direction.

The perpendicular magnetic recording medium is generally formed with a substrate, a soft magnetic underlayer (SUL), an interlayer, an underlayer, a perpendicular magnetic recording layer made of a hard magnetic material, and a protective layer for protecting the surface of the perpendicular magnetic recording layer. The SUL serves to concentrate a magnetic flux generated from a magnetic head and to serve as a flux return path back to the return pole of the head during recording on the magnetic recording layer. The underlayer and the interlayer serve to control the size of magnetic crystal grains and the orientation of the magnetic crystal grains in the magnetic recording layer. The underlayer and the interlayer also serve to magnetically de-couple the SUL and the perpendicular magnetic recording layer.

The interlayer above the SUL may be an amorphous material or a crystalline material with a Face Centered Cubic (FCC) or HCP structure. For example, Ni or Cu alloys such as NiFe or CuNb can be used for the interlayer. The underlayer above the interlayer is typically made from Ruthenium (Ru) or a Ru-alloy. One problem with many current layer structures for perpendicular magnetic recording media is that if the interlayer is made of a material that is ferromagnetic, the material can couple with the SUL and increase the media noise. It is also desirable for the interlayer to give rise to small, uniform grains and strong perpendicular c-axis orientation in the underlayer and magnetic layer. This creates maximum signal-to-noise ratio (SNR) and high coercivity (Hc) for the medium.

SUMMARY OF THE SOLUTION

The invention solves the above and other related problems with an interlayer made of a nonmagnetic Ni-alloy having a Face Centered Cubic (FCC) structure. The alloying element for the Ni-alloy may comprise one of Vanadium (V) or Chromium (Cr), or may comprise one of V, Cr, or Tungsten (W). The alloying elements (V, Cr, and W) for the interlayer advantageously make the Ni-alloy nonmagnetic, which improves the signal-to-noise ratio (SNR). The Ni-alloy for the interlayer also provides higher coercivity (Hc) than some prior interlayer materials.

One embodiment of the invention comprises a perpendicular magnetic recording medium that includes the improved interlayer. The perpendicular magnetic recording medium includes the interlayer, an underlayer, and a perpendicular magnetic recording layer. The interlayer is comprised of a Ni-alloy having the characteristics of being nonmagnetic and having an FCC structure. The alloying element for the Ni-alloy may comprise one of V or Cr, or may comprise one of V, Cr, or W. The concentration of the alloying element is set such that the concentration of the alloying element is high enough to make the Ni-alloy non-magnetic, while low enough to maintain an FCC structure for the Ni-alloy.

Other embodiments of the perpendicular magnetic recording medium and methods of fabricating the perpendicular magnetic recording medium are described with the interlayer provided above.

The invention may include other exemplary embodiments described below.

DESCRIPTION OF THE DRAWINGS

The same reference number represents the same element on all drawings.

DETAILED DESCRIPTION OF THE INVENTION

FIGS. 1-9 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
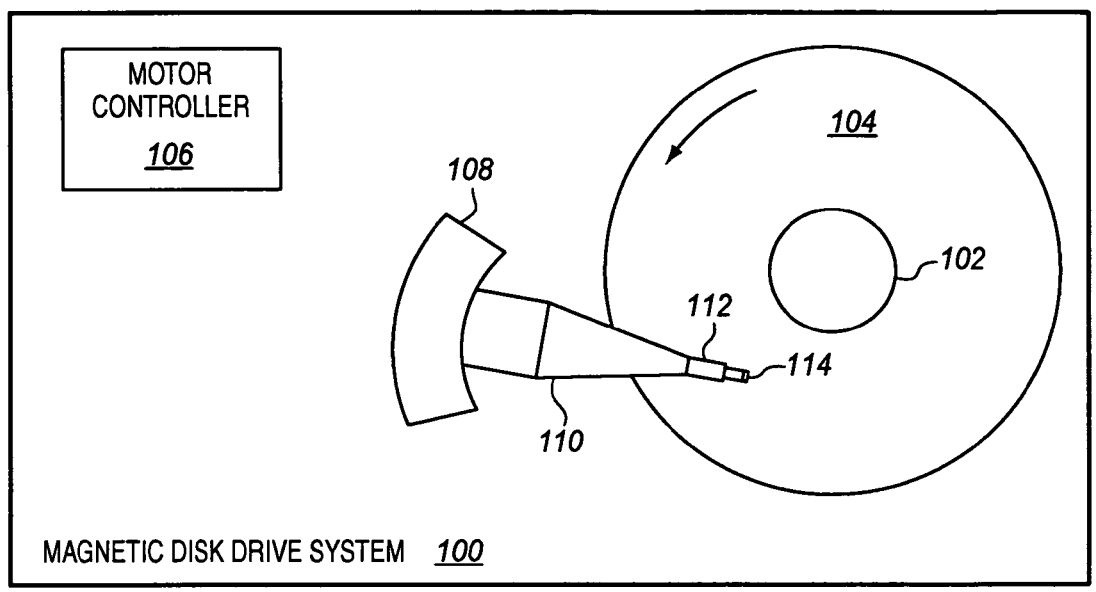
FIG. 1 illustrates a magnetic disk drive system in an exemplary embodiment of the invention.

FIG. 1 illustrates a magnetic disk drive system 100 in an exemplary embodiment of the invention. Magnetic disk drive system 100 includes a spindle 102, a perpendicular magnetic recording medium 104, a motor controller 106, an actuator 108, an actuator arm 110, a suspension arm 112, and a recording head 114. Spindle 102 supports and rotates a perpendicular magnetic recording medium 104 in the direction indicated by the arrow. A spindle motor (not shown) rotates spindle 102 according to control signals from motor controller 106. Recording head 114 is supported by suspension arm 112 and actuator arm 110. Actuator arm 110 is connected to actuator 108 that is configured to rotate in order to position recording head 114 over a desired track of perpendicular magnetic recording medium 104. Magnetic disk drive system 100 may include other devices, components, or systems not shown in FIG. 1. For instance, a plurality of magnetic disks, actuators, actuator arms, suspension arms, and recording heads may be used.

When perpendicular magnetic recording medium 104 rotates, an air flow generated by the rotation of magnetic disk 104 causes an air bearing surface (ABS) of recording head 114 to ride on a cushion of air at a particular height above magnetic disk 104. The height depends on the shape of the ABS. As recording head 114 rides on the cushion of air, actuator 108 moves actuator arm 110 to position a read element (not shown) and a write element (not shown) in recording head 114 over selected tracks of perpendicular magnetic recording medium 104.

The perpendicular magnetic recording medium 104 is shown as a disk in FIG. 1. However, a perpendicular magnetic recording medium as discussed can take on other forms in other embodiments.

Figure 2:
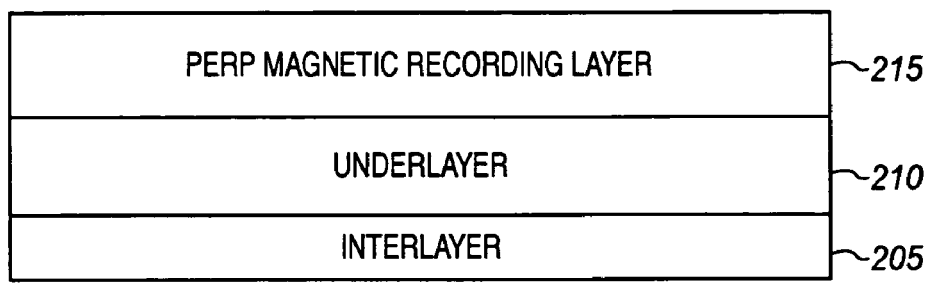
FIGS. 2-4 illustrate exemplary embodiments of a perpendicular magnetic recording medium.
Figure 3:
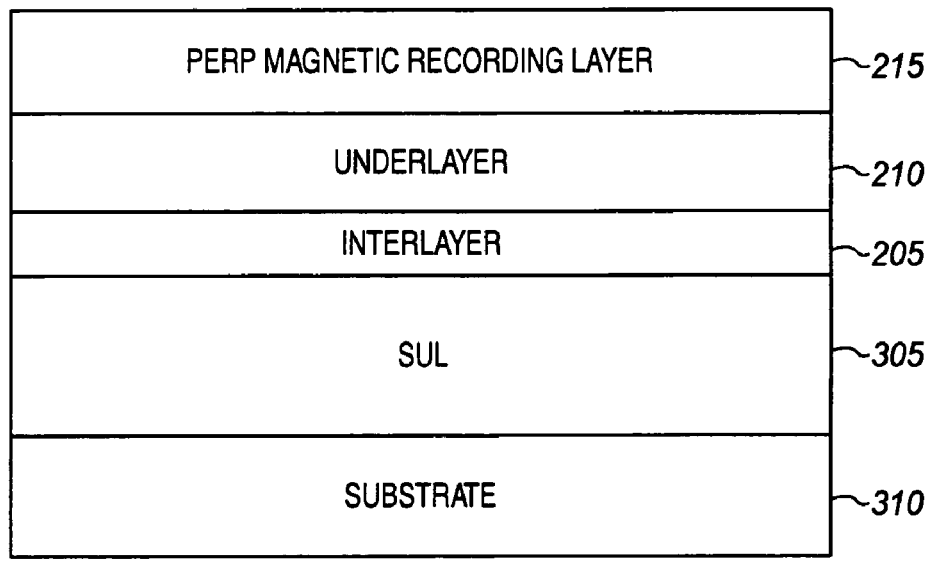
Figure 4:
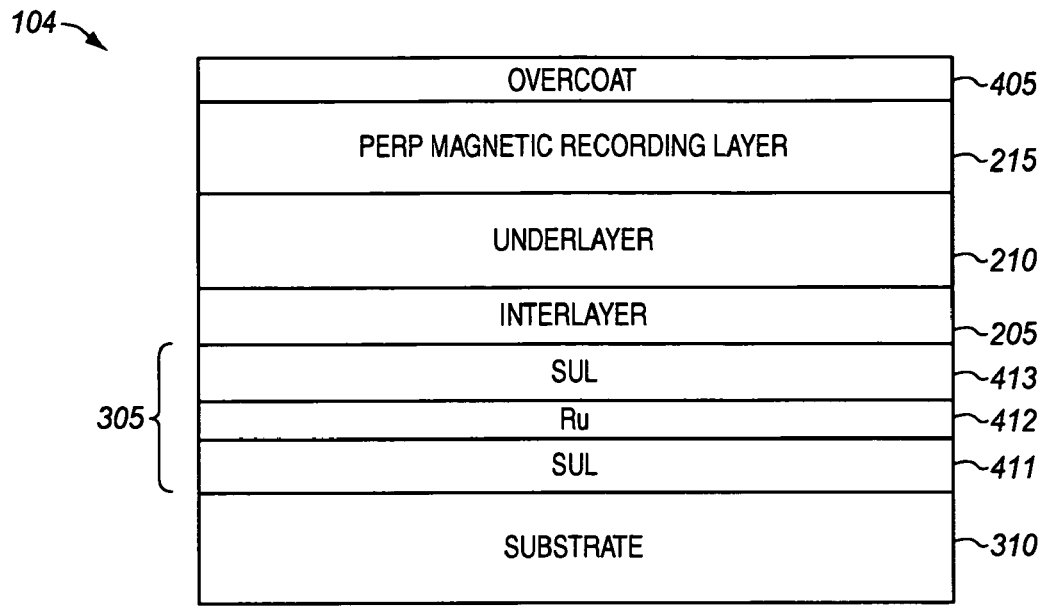

FIGS. 2-4 illustrate possible embodiments of the perpendicular magnetic recording medium 104.

FIG. 2 is a cross-sectional view of one possible embodiment of perpendicular magnetic recording medium 104. Perpendicular magnetic recording medium 104 includes an interlayer 205, an underlayer 210, and a perpendicular magnetic recording layer 215. The layers shown in FIG. 2 may be deposited on a substrate (not shown) or on multiple other layers (not shown) previously deposited on a substrate. Perpendicular magnetic recording medium 104 may include other layers not shown in FIG. 2.

Perpendicular magnetic recording layer 215 comprises one or more materials that have an easy axis of magnetization oriented substantially perpendicular to the substrate. Perpendicular magnetic recording layer 215 is typically formed from a Co-alloy and may contain elements such as Cr and Pt as well as oxides such as $SiO_2$.

Interlayer 205 and underlayer 210 control the orientation and grain diameter of the perpendicular magnetic recording layer 215. Underlayer 210 is made of a material having an HCP structure, such as Ru.

According to the invention, interlayer 205 is comprised of a Ni-alloy having the characteristics of being nonmagnetic and having a Face-Centered Cubic (FCC) structure. The alloying element for the Ni-alloy comprises one of V or Cr in one embodiment, or one of V, Cr, or W in another embodiment. The concentration of the alloying element is set such that the concentration of the alloying element is high enough to make the Ni-alloy non-magnetic, while low enough to maintain an FCC structure for the Ni-alloy. For instance, if the alloying element is V, then the concentration of V in the Ni-alloy is between about 5-15 atomic percent V to have the desired characteristics of the Ni-alloy. If the alloying element is Cr, then the concentration of Cr in the Ni-alloy is between about 15-25 atomic percent Cr to have the desired characteristics of the Ni-alloy. If the alloying element is W, then the concentration of W in the Ni-alloy is between about 5-12 atomic percent W to have the desired characteristics of the Ni-alloy.

FIG. 3 is a cross-sectional view of another possible embodiment of perpendicular magnetic recording medium 104. As in FIG. 2, perpendicular magnetic recording medium 104 includes interlayer 205, underlayer 210, and perpendicular magnetic recording layer 215. In FIG. 3, perpendicular magnetic recording medium 104 further includes a soft magnetic underlayer (SUL) 305 and a substrate 310. Substrate 310 is the base upon which the other materials are deposited. Substrate 310 may be comprised of a nonmagnetic metal, such as aluminum or an aluminum alloy, or may be comprised of a nonmagnetic material, such as glass, ceramics, silicon, etc.

SUL 305 acts in conjunction with the head to increase the perpendicular field magnitude and improve the field gradient generated by a recording head passing over the perpendicular magnetic recording medium 104. Perpendicular magnetic recording medium 104 may include other layers not shown in FIG. 3.

FIG. 4 is a cross-sectional view of another possible embodiment of perpendicular magnetic recording medium 104. As in FIG. 3, perpendicular magnetic recording medium 104 includes substrate 310, SUL 305, interlayer 205, underlayer 210, and perpendicular magnetic recording layer 215. In FIG. 4, perpendicular magnetic recording medium 104 further includes an overcoat layer 405 above the perpendicular magnetic recording layer 215. Overcoat layer 405 protects perpendicular magnetic recording layer 215 against corrosion and against damage if the recording head happens to contact the perpendicular magnetic recording medium 104.

In FIG. 4, SUL 305 is comprised of three layers. SUL 305 is comprised of a first SUL layer 411 and a second SUL layer 413 separated by a layer 412 of Ru. The first SUL layer 411 is sandwiched between the Ru layer 412 and the substrate 310. The second SUL layer 413 is sandwiched between the Ru layer 412 and the interlayer 205.

In this embodiment, the thicknesses of each layer are as follows. The perpendicular magnetic recording layer 215 is about 10-18 nm. The underlayer 210 is about 6-20 nm. The interlayer 205 is about 2-6 nm. The SUL 305 is about 80-150 nm.

Figures 8, 9:
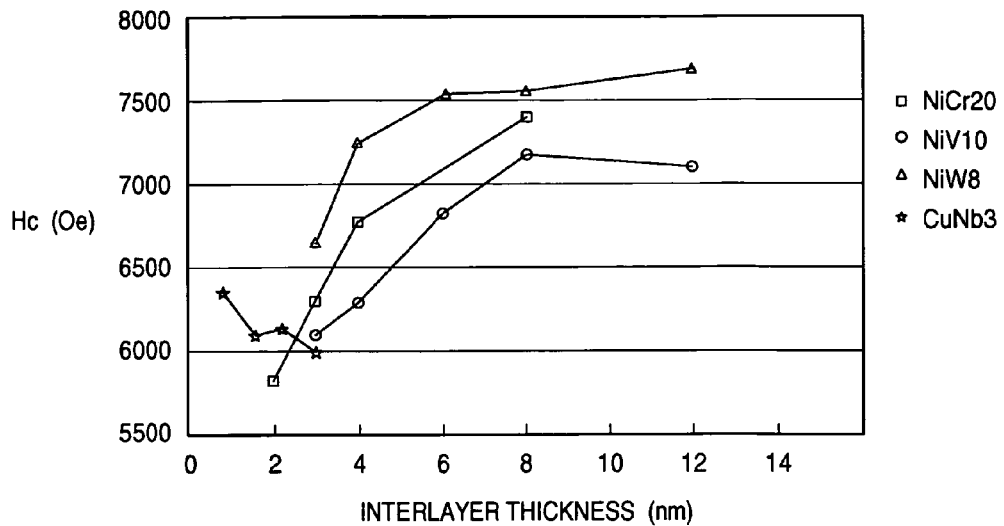
FIG. 8 is a graph illustrating the coercivity (Hc) of an interlayer using nonmagnetic Ni-alloys of the invention.
FIG. 9 is a table illustrating the performance of the nonmagnetic Ni-alloys of the invention.

The alloying elements (V, Cr, and W) described above for the interlayer 205 advantageously make the Ni-alloy non-magnetic, which improves the signal-to-noise ratio (SNR). The Ni-alloy for the interlayer 205 also provides higher coercivity (Hc) than some prior interlayer materials. FIGS. 8-9 illustrate the improved performance provided by the Ni-alloy of the invention.

FIG. 8 is a graph illustrating the coercivity of the interlayer 205 using the nonmagnetic Ni-alloys of the invention. The graph in FIG. 8 illustrates the coercivity of the alloy NiCr with a concentration of 20 atomic percent Cr, the coercivity of the alloy NiV with a concentration of 10 atomic percent V, and the coercivity of the alloy NiW with a concentration of 8 atomic percent W. To contrast the coercivity of the Ni-alloys described in the invention with a current material (CuNb) used for an interlayer, the graph also shows the coercivity of CuNb with a concentration of 3 atomic percent Nb. As is evident from the graph, each of the Ni-alloys of NiCr, NiV, and NiW described herein have improved coercivity over prior materials used for orienting a perpendicular magnetic recording layer.

FIG. 9 is a table 900 illustrating the performance of the nonmagnetic Ni-alloys of the invention. Table 900 illustrates the coercivity and signal-to-noise ratio (SNR) of the alloys NiCr, NiV, and NiW at a thickness of 4 nm each. The coercivity and SNR of the Ni-alloys described in the invention are contrasted again with CuNb at a thickness of 1.5 nm. As is evident from table 900, the Ni-alloys of NiCr, NiV, and NiW described herein have improved coercivity and SNR over prior materials used for orienting a perpendicular magnetic recording layer.

Figure 5:
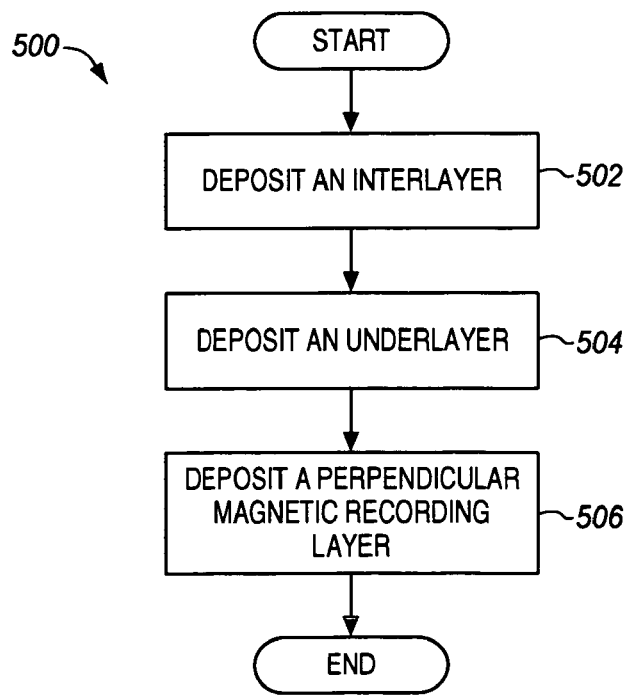
FIGS. 5-7 are flow charts illustrating possible methods of fabricating a perpendicular magnetic recording medium in exemplary embodiments of the invention.
Figure 6:
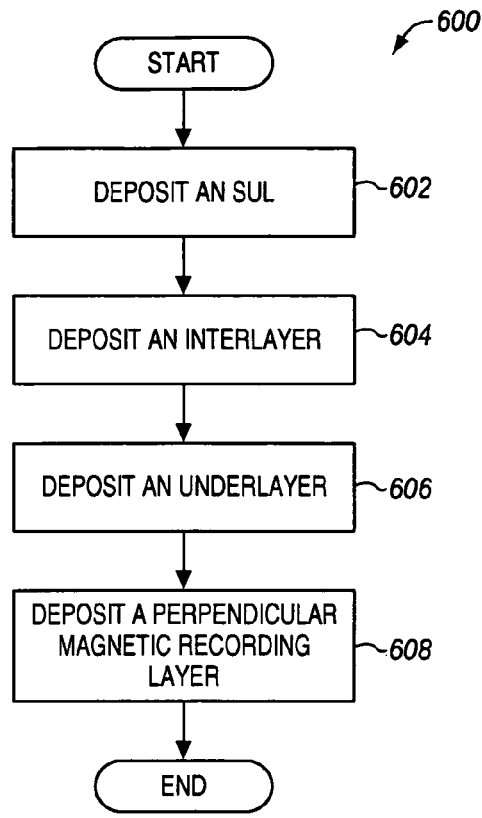
Figure 7:
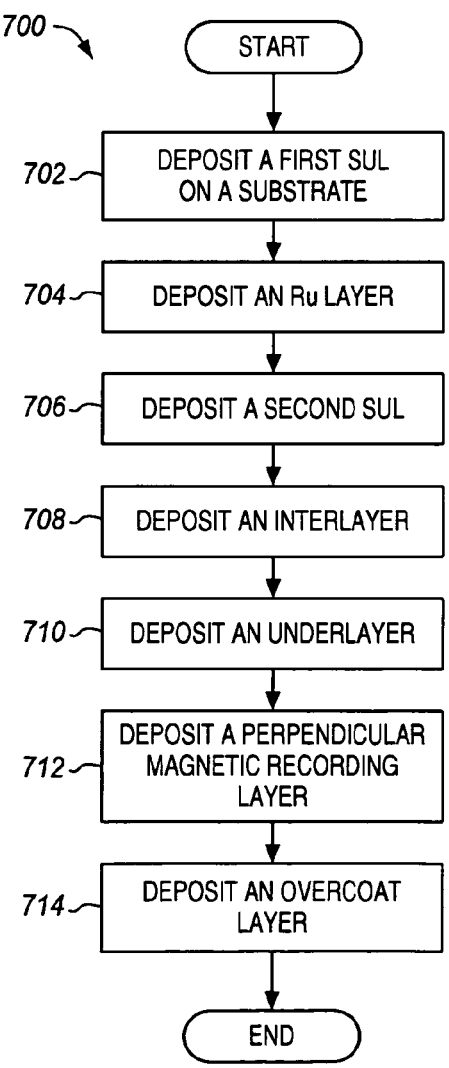

FIGS. 5-7 illustrate possible methods of fabricating the perpendicular magnetic recording medium 104.

FIG. 5 is a flow chart of one possible method 500 of fabricating perpendicular magnetic recording medium 104. In step 502, material for an interlayer 205 is deposited (see FIG. 2). The interlayer 205 may be deposited on a substrate or on other layers previously deposited. As stated above, the interlayer 205 is comprised of a nonmagnetic Ni-alloy having an FCC structure, where the alloying element for the Ni-alloy comprises one of V, Cr, or W. Therefore, the material for the desired Ni-alloy is deposited in step 502. In step 504, material for an underlayer 210 is deposited on the interlayer 205. The material for the underlayer 210 may comprise Ru or another similar material. In step 506, material for a perpendicular magnetic recording layer 215 is deposited on the underlayer 210. Method 500 forms the perpendicular magnetic recording medium 104 illustrated in FIG. 2. There may be other layers of material deposited than those described in method 500.

FIG. 6 is a flow chart of another possible method 600 of fabricating perpendicular magnetic recording medium 104. In step 602, material for a soft magnetic underlayer (SUL) 305 is deposited on a substrate 310 (see FIG. 3). In step 604, material for an interlayer 205 is deposited on the SUL 305. In step 606, material for an underlayer 210 is deposited on the interlayer 205. In step 608, material for a perpendicular magnetic recording layer 215 is deposited on the underlayer 210. Method 600 forms the perpendicular magnetic recording medium 104 illustrated in FIG. 3. There may be other layers of material deposited than those described in method 600.

FIG. 7 is a flow chart of another possible method 700 of fabricating perpendicular magnetic recording medium 104. In step 702, material for a first SUL layer 411 is deposited on a substrate 310 (see FIG. 4). In step 704, a layer 412 of Ru is deposited on the first SUL layer 411. In step 706, material for a second SUL layer 413 is deposited on the Ru layer 412. In step 708, material for an interlayer 205 is deposited on the second SUL layer 413. In step 710, material for an underlayer 210 is deposited on the interlayer 205. In step 712, material for a perpendicular magnetic recording layer 215 is deposited on the underlayer 210. In step 714, material for an overcoat layer 405 is deposited on the perpendicular magnetic recording layer 215. Method 700 forms the perpendicular magnetic recording medium 104 illustrated in FIG. 4. There may be other layers of material deposited than those described in method 700.

We claim:

1. A perpendicular magnetic recording medium, comprising:
    an interlayer;
    an underlayer; and
    a perpendicular magnetic recording layer;
    wherein the underlayer is between the interlayer and the perpendicular magnetic recording layer;
    wherein the interlayer is comprised of a nonmagnetic NiW alloy having a Face-Centered Cubic (FCC) structure.

2. The perpendicular magnetic recording medium of claim 1 wherein the concentration of W is high enough to make the NiW alloy non-magnetic, and low enough to maintain the FCC structure for the NiW alloy.

3. The perpendicular magnetic recording medium of claim 1 wherein the concentration of W in the NiW alloy is between about 5-12 atomic percent W.

4. The perpendicular magnetic recording medium of claim 1 wherein the NiW alloy further includes Cr.

5. The perpendicular magnetic recording medium of claim 1 wherein the interlayer and the underlayer control the orientation and grain diameter of the perpendicular magnetic recording layer.

6. A perpendicular magnetic recording medium, comprising:
    a soft magnetic underlayer (SUL) deposited on a nonmagnetic substrate;
    an interlayer deposited on the SUL;
    an underlayer deposited on the interlayer and formed from a material having an HCP structure; and
    a perpendicular magnetic recording layer deposited on the underlayer and having an easy axis of magnetization oriented substantially perpendicular to the substrate;
    wherein the interlayer is comprised of a nonmagnetic NiW alloy having a Face-Centered Cubic (FCC) structure;
    wherein the concentration of W in the NiW alloy is high enough to make the NiW alloy non-magnetic, and low enough to maintain the FCC structure for the NiW alloy.

7. The perpendicular magnetic recording medium of claim 6 wherein the concentration of W in the NiW alloy is between about 5-12 atomic percent W.

8. The perpendicular magnetic recording medium of claim 6 wherein the NiW alloy further includes Cr.

9. The perpendicular magnetic recording medium of claim 6 wherein the underlayer comprises Ru.

10. The perpendicular magnetic recording medium of claim 6 wherein the interlayer and the underlayer control the orientation and grain diameter of the perpendicular magnetic recording layer.

11. The perpendicular magnetic recording medium of claim 6 further comprising:
    an overcoat layer deposited on the perpendicular magnetic recording layer to protect the perpendicular magnetic recording layer.

12. A method of fabricating a perpendicular magnetic recording medium, the method comprising:
    depositing material for an interlayer;
    depositing material for an underlayer on the interlayer; and
    depositing material for a perpendicular magnetic recording layer on the underlayer;
    wherein the interlayer is comprised of a nonmagnetic NiW alloy having a Face-Centered Cubic (FCC) structure;
    wherein the concentration of W in the NiW alloy is high enough to make the NiW alloy non-magnetic, and low enough to maintain the FCC structure for the NiW alloy.

13. The method of claim 12 wherein the concentration of W in the NiW alloy is between about 5-12 atomic percent W.

14. The method of claim 12 wherein the NiW alloy further includes Cr.

15. The method of claim 12 farther comprising:
    depositing material for a soft magnetic underlayer (SUL) on a nonmagnetic substrate before depositing the interlayer, wherein the interlayer is deposited on the SUL.

16. The method of claim 15 farther comprising:
    depositing material for an overcoat layer on the perpendicular magnetic recording layer.

17. A magnetic disk drive system, comprising:
    a recording head; and
    a perpendicular magnetic recording medium readable and writable by the recording head, the perpendicular magnetic recording medium comprising:
    an interlayer;
    an underlayer; and
    a perpendicular magnetic recording layer;
    wherein the underlayer is between the interlayer and the perpendicular magnetic recording layer;
    wherein the interlayer is comprised of a nonmagnetic NiW alloy having a Face-Centered Cubic (FCC) structure,
    wherein the concentration of W in the NiW alloy is high enough to make the NiW alloy non-magnetic, and low enough to maintain the FCC structure for the NiW alloy.

18. The magnetic disk drive system of claim 17 wherein the concentration of W in the NiW alloy is between about 5-12 atomic percent W.

19. The magnetic disk drive system of claim 17 wherein the NiW alloy further includes Cr.

* * * * *

UNITED STATES PATENT AND TRADEMARK OFFICE
CERTIFICATE OF CORRECTION

| | | |
|---|---|---|
| PATENT NO. | : 7,632,580 B2 | Page 1 of 1 |
| APPLICATION NO. | : 11/146348 | |
| DATED | : December 15, 2009 | |
| INVENTOR(S) | : Yoshihiro Ikeda et al. | |

It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 650 days.

should read (*) Notice: Subject to any disclaimer, the term of this patent is extended or adjusted under 35 U.S.C. 154(b) by 1,190 days.

At column 6, line 37, please correct "farther comprising" to read "further comprising".

At column 6, line 41, please correct "farther comprising" to read "further comprising".

Signed and Sealed this

Third Day of August, 2010

David J. Kappos
*Director of the United States Patent and Trademark Office*